(12) United States Patent
Shi et al.

(10) Patent No.: US 12,519,535 B2
(45) Date of Patent: Jan. 6, 2026

(54) ANTENNA SWITCHING METHOD, TERMINAL DEVICE AND COMMUNICATION DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN); Yingpei Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 443 days.

(21) Appl. No.: 17/815,759

(22) Filed: Jul. 28, 2022

(65) Prior Publication Data

US 2022/0368405 A1 Nov. 17, 2022

Related U.S. Application Data

(63) Continuation of application No. PCT/CN2020/075905, filed on Feb. 19, 2020.

(51) Int. Cl.
*H04B 7/08* (2006.01)
*H04L 5/00* (2006.01)

(52) U.S. Cl.
CPC ......... *H04B 7/0814* (2013.01); *H04L 5/0051* (2013.01)

(58) Field of Classification Search
CPC .. H04B 7/0814; H04B 7/0691; H04B 7/0874; H04L 5/0051; H04L 5/0023;
(Continued)

(56) References Cited

U.S. PATENT DOCUMENTS 11,895,598 B2 * 2/2024 Jeon ................... H04W 52/365
12,081,474 B2 * 9/2024 Si ...................... H04W 72/0446
(Continued)

FOREIGN PATENT DOCUMENTS

CN 108260217 A * 7/2018 ............ H04W 72/23
CN 110071749 A * 7/2019 ........... H04B 7/0404
(Continued)

OTHER PUBLICATIONS

Y. Zhang, H. Wang and X. Zhou, "Achieving Channel Reciprocity in Multi-Carrier System: SRS Carrier-Based Switching," 2018 IEEE Globecom Workshops (GC Wkshps), Abu Dhabi, United Arab Emirates, 2018, pp. 1-6 (Year: 2018).*
(Continued)

*Primary Examiner* — Yuwen Pan
*Assistant Examiner* — Swati Jain
(74) *Attorney, Agent, or Firm* — PERKINS COIE LLP (57) ABSTRACT

Embodiments of the present disclosure relate to an antenna switching method, a terminal device and a communication device. The method comprises: a first terminal device receives a configuration message; the configuration message indicates M sounding reference signal (SRS) resource set groups, each SRS resource set group contains at least one SRS resource set, and M is a positive integer; each SRS resource set group corresponds to a corresponding antenna switching configuration, and the antenna switching configuration supports the first terminal device to have more than four receiving antennas. Embodiments of the present disclosure can achieve antenna switching for a terminal device having many (e.g., more than four) receiving antennas.

17 Claims, 3 Drawing Sheets

(58) Field of Classification Search
CPC .. H04L 5/0053; H04L 5/0094; H04W 52/146; H04W 52/325
See application file for complete search history.

(56) References Cited

U.S. PATENT DOCUMENTS

| | | | | |
|---|---|---|---|---|
| 2019/0253214 | A1* | 8/2019 | Liu | H04B 7/0456 |
| 2020/0403749 | A1* | 12/2020 | Park | H04L 5/0048 |
| 2021/0135816 | A1* | 5/2021 | Davydov | H04L 5/0091 |
| 2021/0135823 | A1* | 5/2021 | Zhang | H04B 7/0684 |
| 2021/0234588 | A1* | 7/2021 | Li | H04L 25/0226 |
| 2021/0281373 | A1* | 9/2021 | Liu | H04B 7/0413 |
| 2022/0140973 | A1* | 5/2022 | Qin | H04L 5/0051 370/336 |
| 2022/0173784 | A1* | 6/2022 | Gao | H04B 7/0874 |
| 2023/0047048 | A1* | 2/2023 | Liu | H04B 7/0417 |
| 2023/0058830 | A1* | 2/2023 | Zhang | H04L 5/0051 |
| 2023/0247558 | A1* | 8/2023 | Duan | H04L 5/0094 370/311 |
| 2024/0014849 | A1* | 1/2024 | Wang | H04L 5/0053 |
| 2024/0056986 | A1* | 2/2024 | Jeon | H04W 76/00 |
| 2024/0107460 | A1* | 3/2024 | Yao | H04W 52/242 |
| 2024/0356780 | A1* | 10/2024 | Manolakos | G01S 5/0205 |

FOREIGN PATENT DOCUMENTS

| | | | | |
|---|---|---|---|---|
| CN | 110650485 | A * | 1/2020 | H04B 1/401 |
| CN | 111262679 | A | 6/2020 | |
| CN | 111464275 | A * | 7/2020 | H04B 7/0413 |
| EP | 3998793 | A1 * | 5/2022 | H04B 7/0608 |
| EP | 4042647 | A1 | 8/2022 | |
| KR | 20190086332 | A * | 7/2019 | |
| WO | 2018126474 | A1 | 7/2018 | |
| WO | WO-2019141285 | A1 * | 7/2019 | H04B 7/0404 |
| WO | 2019160775 | A1 | 8/2019 | |

OTHER PUBLICATIONS

Vivo: "Discussion on UE adaptation to maximum number of MIMO layers", 3GPP Draft; R1-1910235, Oct. 4, 2019 (Oct. 4, 2019}, pp. 1-5. (Year: 2019).*
Nokia: "Introduction of downgraded configuration for SRS antenna switching", 3GPP Draft; R1-1913677, Nov. 22, 2019, pp. 1-3. (Year: 2019).*
3GPP TSG RAN WG1 Meeting 91—R1-1720766—Reno, USA, Nov. 27-Dec. 1, 2017—Huawei, HiSilicon, Enhancement of SRS antenna switching in 36.213 (4 pages). (Year: 2017).*
Vivo: "Discussion on UE adaptation to maximum number of MIMO Layers", 3GPP Draft; R1-1910235, 3rd Generation Partnership Project (3GPP), Mobile Competence Centre; 650, Route DES Lucioles; F-06921 Sophia-Antipolis Cedex; France. Oct. 4, 2019, pp. 1-5.
Colzi, Enrico. European Application No. 20920574 Search Report Mailed Dec. 22, 2022, pp. 1-13.
3GPP TSG RAN WG1 Meeting 91—R1-1720766—Reno, USA, Nov. 27-Dec. 1, 2017—Huawei, HiSilicon, Enhancement of SRS antenna switching in 36.213 (4 pages).
3GPP TSG-RAN WG1 Meeting #99—R1-1913677—Reno, USA, Nov. 18-22, 2019—Nokia, Introduction of downgraded configurations for SRS antenna switching (3 pages).
International Search Report issued Nov. 11, 2020 of PCT/CN2020/075905 (4 pages).
Written Opinion issued Nov. 11, 2020 of PCT/CN2020/075905 (12 pages).
Search Report for European Application No. 24157400.3 Issued May 15, 2024, 5 Pages.

* cited by examiner

A first terminal device receives configuration information; the configuration information indicating M SRS resource set groups, each of which contains at least one SRS resource set; wherein M is a positive integer; each SRS resource set group corresponding to a corresponding antenna switching configuration that supports the first terminal device to have more than four receiving antennas ⎯S210

A communication device sends configuration information that indicates M SRS resource set groups, each of which contains at least one SRS resource set; wherein M is a positive integer; each SRS resource set group corresponding to a corresponding antenna switching configuration that supports a first terminal device to have more than four receiving antennas ⎯S310

ANTENNA SWITCHING METHOD, TERMINAL DEVICE AND COMMUNICATION DEVICE

CROSS-REFERENCE TO RELATED APPLICATION

The present application is a continuation application of International PCT Application No. PCT/CN2020/075905, filed on Feb. 19, 2020, the entire content of which is hereby incorporated by reference.

TECHNICAL FIELD

The present disclosure relates to the communication field, and more particularly, to an antenna switching method, a terminal device, and a communication device.

BACKGROUND

Multiple Input Multiple Output (MIMO) technology is widely used in wireless communication systems. By virtue of the MIMO technology, various kinds of gains can be obtained, e.g. a space diversity gain, a beamforming gain (also referred to as a pre-coding gain), a space multiplexing gain. In order to obtain the beamforming gain/pre-coding gain or space multiplexing gain, a transmitter needs to determine a beamforming matrix/pre-coding matrix for signal transmission. For determination of a beamforming matrix/pre-coding matrix of a terminal, a basic requirement is to obtain some form of channel information of a transmission channel corresponding to the terminal.

In an actual system, in order to obtain the channel information of the transmission channel of the terminal, a channel reciprocity method may be adopted. The channel reciprocity method needs the terminal to transmit a Sounding Reference Signal (SRS) according to configuration information from a base station, and the configuration information is related to an antenna switching configuration of the terminal. The antenna switching configuration may be represented by xTyR or txry, wherein x and y are positive integers, specifically indicating that the SRS may be transmitted through x antenna ports, and y corresponds to the number of all or part of the receiving antennas of a terminal device. At present, with increase of size of the terminal device, the terminal may improve a downlink receiving capability with more receiving antennas. The antenna switching configuration, xTyR, of the terminal device has a large value of y, for example, y is greater than 4. At present, there is no suitable configuration mode to support antenna switching for these terminal devices which have more (such as more than 4) receiving antennas.

SUMMARY

Embodiments of the present disclosure provide an antenna switching method, a terminal device and a communication device, which can achieve antenna switching of a terminal device having many (e.g., more than four) receiving antennas.

In an embodiment of the present disclosure, an antenna switching method is provided, which includes: a first terminal device receives configuration information; wherein the configuration information indicates M Surrounding Reference Signal (SRS) resource set groups, each of which contains at least one SRS resource set; wherein M is a positive integer; each of the SRS resource set groups corresponds to a corresponding antenna switching configuration that supports the first terminal device to have more than four receiving antennas.

In an embodiment of the present disclosure, an antenna switching method is provided, which includes: a communication device sends configuration information; wherein the configuration information indicates M Surrounding Reference Signal (SRS) resource set groups, each of which contains at least one SRS resource set; wherein M is a positive integer; each of the SRS resource set groups corresponds to a corresponding antenna switching configuration that supports a first terminal device to have more than four receiving antennas.

In an embodiment of the present disclosure, a terminal device is provided, which includes: a receiving module, configured to receive configuration information; wherein the configuration information indicates M sounding reference signal (SRS) resource set groups, each SRS resource set group contains at least one SRS resource set, and M is a positive integer; each SRS resource set group corresponds to a corresponding antenna switching configuration, and the antenna switching configuration supports the terminal device to have more than four receiving antennas.

In an embodiment of the present disclosure, a network device is provided, which includes: a sending module, configured to send configuration information; wherein the configuration information indicates M sounding reference signal (SRS) resource set groups, each SRS resource set group contains at least one SRS resource set, and M is a positive integer; each SRS resource set group corresponds to a corresponding antenna switching configuration, and the antenna switching configuration supports a first terminal device to have more than four receiving antennas.

A terminal device is provided in an embodiment of the present disclosure, which includes a processor and a memory. The memory is configured to store a computer program, and the processor is configured to invoke and run the computer program stored in the memory to execute the antenna switching method described above.

A communication device is provided in an embodiment of the present disclosure, which includes a processor and a memory. The memory is configured to store a computer program, and the processor is configured to invoke and run the computer program stored in the memory to execute the antenna switching method described above.

In an embodiment of the present disclosure, a chip is provided, which is configured to perform the above-mentioned antenna switching method.

Specifically, the chip includes a processor configured to invoke and run a computer program from a memory to enable a device having the chip installed therein to perform the above-mentioned antenna switching method.

In an embodiment of the present disclosure, a computer-readable storage medium is provided, which is configured to store a computer program, and the computer program enables a computer to perform the above-mentioned antenna switching method.

In an embodiment of the present disclosure, a computer program product is provided, which includes computer program instructions, wherein the computer program instructions enable a computer to perform the above-mentioned antenna switching method.

In an embodiment of the present disclosure, a computer program is provided, which, when running on a computer, enables the computer to perform the above-mentioned antenna switching method.

In the embodiments of the present disclosure, a terminal receives configuration information, and one SRS resource set group indicated by the configuration information corresponds to an antenna switching configuration corresponding to xTyR (where y is greater than 4), thereby achieving antenna switching of a terminal device having many (e.g. more than four) receiving antennas.

DETAILED DESCRIPTION

Technical solutions in the embodiments of the present disclosure will be described below in combination with accompanying drawings in the embodiments of the present disclosure.

The technical solutions of the embodiments of the present disclosure may be applied to various communication systems, e.g., a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunications System (UMTS), Wireless Local Area Networks (WLAN), Wireless Fidelity (WiFi), a next generation communication (5th-Generation (5G)) system, or another communication system.

Generally speaking, traditional communication systems support a limited quantity of connections, and are easy to implement. However, with development of communication technologies, mobile communication systems will not only support traditional communication, but also support, for example, Device to Device (D2D) communication, Machine to Machine (M2M) communication, Machine Type Communication (MTC), and Vehicle to Vehicle (V2V) communication, and the embodiments of the present disclosure may also be applied to these communication systems.

Alternatively, a communication system in the embodiments of the present disclosure may be applied to a Carrier Aggregation (CA) scenario, or a Dual Connectivity (DC) scenario, or a Standalone (SA) network deployment scenario.

A frequency spectrum to which an embodiment of the present disclosure is applied is not limited. For example, the embodiment of the present disclosure may be applied to a licensed spectrum, or an unlicensed spectrum.

Various embodiments of the present disclosure are described in combination with the network device and the terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus, etc. The terminal device may be a STATION (ST) in the WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, or a next generation communication system, e.g., a terminal device in an NR network, or a terminal device in a future evolved Public Land Mobile Network (PLMN).

As an example but not a limitation, in the embodiments of the present disclosure, the terminal device may also be a wearable device. The wearable device may also be referred to as a wearable smart device, which is a general term of wearable devices, e.g., glasses, gloves, a watch, clothing, or shoes, which are intelligent designed for daily wear and developed by using wearing technologies. The wearable device is a portable device that is worn directly on a body, or integrated into clothes or an accessory of a user. The wearable device is not only a hardware device, but also achieves powerful functions through software support, data interaction, and cloud interaction. Generalized wearable smart devices include a device that is full functioned, large sized, and may achieve complete or partial functions without relying on a smart phone, such as a smart watch, or smart glasses, and include a device that only focuses on a kind of application function, and needs to be used in conjunction with another device such as a smart phone, such as various types of smart bracelets, smart jewelry, or the like, for monitoring physical signs.

The network device may be a device configured to communicate with a mobile device, and may be an Access Point (AP) in WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, a network device (gNB) in an NR network, or a network device in a future evolved PLMN network, etc.

In an embodiment of the present disclosure, a network device provides a service for a cell, and a terminal device communicates with the network device through a transmission resource (e.g., a frequency domain resource, or referred to as a spectrum resource) used for the cell, wherein the cell may be a cell corresponding to the network device (e.g., a base station). The cell may belong to a macro base station, or a base station corresponding to a Small cell. The Small cell here may include: a Metro cell, a Micro cell, a Pico cell, or a Femto cell, etc. These Small cells have characteristics of a small coverage range and a low transmission power, and are suitable for providing high-speed data transmission services.

Figure 1:
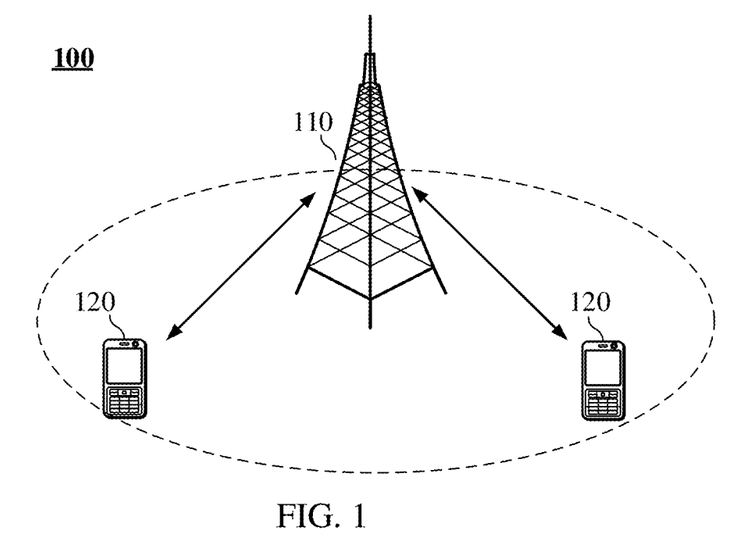
FIG. 1 is a schematic diagram of an application scenario according to an embodiment of the present disclosure.

FIG. 1 exemplarily illustrates one network device 110 and two terminal devices 120. Alternatively, a wireless communication system 100 may include a plurality of network devices 110, and another quantity of terminal devices may be included within a coverage range of each network device 110, which is not limited in the embodiments of the present disclosure. Embodiments of the present disclosure may be applied to one terminal device 120 and one network device 110, and may also be applied to one terminal device 120 and another terminal device 120.

Alternatively, the wireless communication system 100 may further include another network entity such as a Mobility Management Entity (MME), and an Access and Mobility Management Function (AMF), which is not limited in the embodiments of the present disclosure.

It should be understood that the terms "system" and "network" are often used interchangeably herein. The term "and/or" herein refers to an association relationship describing associated objects only, which indicates that three kinds of relationships may exist, for example, A and/or B may indicate three cases: A alone, both A and B at the same time, and B alone. In addition, the symbol "/" herein generally indicates that objects before and after the symbol "/" have an "or" relationship. The "beamforming" and "pre-coding" herein can often be used interchangeably. For simplicity of description, "xTyR" herein also contains "xT=yR" when x=y.

Figure 2:
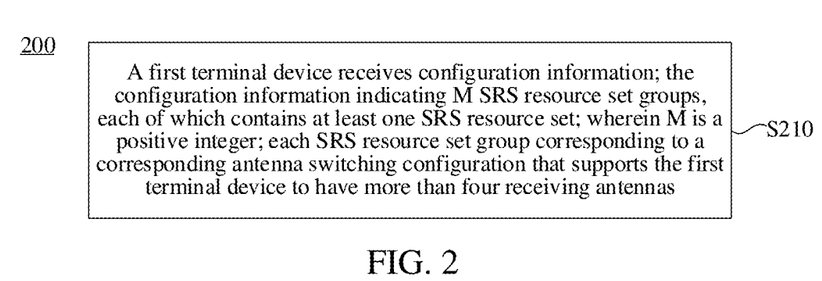
FIG. 2 is a flow chart of an implementation of an antenna switching method according to an embodiment of the present disclosure.

An antenna switching method is provided in an embodiment of the present disclosure. FIG. 2 is a flow chart of an implementation of an antenna switching method according to an embodiment of the present disclosure, including the following act S210.

In the act S210, a first terminal device receives configuration information, the configuration information indicates M Surrounding Reference Signal (SRS) resource set groups, each of which contains at least one SRS resource set; wherein M is a positive integer; and each SRS resource set group corresponds to a corresponding antenna switching configuration that supports a first terminal device to have more than four receiving antennas.

Alternatively, the antenna switching configuration is represented by xTyR; wherein y is an integer greater than 4 and x is a positive integer; xTyR indicates that the SRS may be transmitted by x antenna ports, y corresponds to the number of all or part of receiving antennas of the first terminal device.

Alternatively, the antenna port may refer to a transmitting antenna.

It should be noted that the SRS resource set group may represent one or more SRS resource sets. One or more SRS resource sets may be regarded as one whole, which is referred to as for short an SRS resource set group, and it is not necessary to define one or more SRS resource sets as an SRS resource set group.

Alternatively, if a resourceType field corresponding to the SRS resource set contained in the SRS resource set group is configured to be periodic or semipersistent, the SRS resource set group contains one SRS resource set. That is, the corresponding SRS resource set group is equal to the SRS resource set (the SRS resource set group contains only one SRS resource set).

Alternatively, when x is not equal to y, resourceType fields corresponding to SRS resource sets in different SRS resource set groups are configured to be different values. When x is equal to y, resourceType fields corresponding to SRS resource sets in different SRS resource set groups are configured to be a same value or different values.

Alternatively, the configuration information is sent from a network device to the first terminal device.

Alternatively, the configuration information is sent from another terminal device (such as a second terminal device) to the first terminal device, which can better support communication between terminals, such as Device-to-Device (D2D) communication, Vehicle to Everything (V2X) communication, or Sidelink communication.

Alternatively, the first terminal device reports an antenna switching capability that supports the antenna switching configuration represented by the xTyR. The antenna switching capability can also be referred to as an antenna switching capability corresponding to xTyR.

Alternatively, the first terminal device may report the antenna switching capability via Radio Resource Control (RRC) signaling.

Alternatively, M=1, 2, or 3, therefore more configurations can be supported, flexibility of a system configuration can be improved, and system performance can be improved.

Alternatively, the M SRS resource set groups contain at least one first SRS resource set group, and the first SRS resource set group corresponds to an antenna switching configuration corresponding to 8T8R; wherein, the first SRS resource set group contains one SRS resource set; each SRS resource set contains one SRS resource, and each SRS resource is configured with eight SRS ports.

Alternatively, the M SRS resource set groups contain at least one second SRS resource set group, and the second SRS resource set group corresponds to an antenna switching configuration corresponding to 4T8R; wherein, the second SRS resource set group contains one SRS resource set, each SRS resource set contains two SRS resources, and each SRS resource is configured with four SRS ports.

Alternatively, the M SRS resource set groups contain at least one third SRS resource set group, and the third SRS resource set group corresponds to an antenna switching configuration corresponding to 2T8R; if a resourceType field corresponding to an SRS resource set in the third SRS resource set group is configured to be periodic or semipersistent, the third SRS resource set group contains one SRS resource set, and the SRS resource set contains four SRS resources, and each SRS resource is configured with two SRS ports.

Alternatively, the M SRS resource set groups contain at least one fourth SRS resource set group, and the fourth SRS resource set group corresponds to an antenna switching configuration corresponding to 2T8R. If a resourceType field corresponding to an SRS resource set in the fourth SRS resource set group is configured to be aperiodic, then: the fourth SRS resource set group contains two SRS resource sets, and each SRS resource set contains two SRS resources, each SRS resource is configured with 2 SRS ports, SRS resources in different SRS resource sets are transmitted on different slots, and SRS resources in a same resource set are transmitted on different symbols of a same slot; or, the fourth SRS resource set group contains two SRS resource sets, one of the two SRS resource set contains one SRS resource and the other SRS resource set contains three SRS resources, each SRS resource is configured with 2 SRS ports; SRS resources in different SRS resource sets are transmitted on different slots, and SRS resources in a same resource set are transmitted on different symbols of a same slot; or, the fourth SRS resource set group contains one SRS resource set, the SRS resource set contains fourth SRS resources, And each SRS resource is configured with 2 SRS ports.

Alternatively, the M SRS resource set groups contain at least one fifth SRS resource set group, and the fifth SRS resource set group corresponds to an antenna switching configuration corresponding to 1T8R.

If a resourceType field corresponding to an SRS resource set in the fifth SRS resource set group is configured to be periodic or semipersistent, the fifth SRS resource set group contains one SRS resource set. The SRS resource set contains eight SRS resources. Each SRS resource is configured with one SRS port.

Alternatively, the M SRS resource set groups contain at least one sixth SRS resource set group, and the sixth SRS resource set group corresponds to an antenna switching configuration corresponding to 1T8R.

If a resourceType field corresponding to an SRS resource set in the sixth SRS resource set group is configured to be aperiodic, then: the sixth SRS resource set group contains two SRS resource sets, the two SRS resource sets contain eight SRS resources in total (for example, each of the two SRS resource sets contains four SRS resources, respectively), each SRS resource is configured with one SRS port; SRS resources in different SRS resource sets are transmitted on different slots, and SRS resources in a same resource set are transmitted on different symbols of a same slot; or, the sixth SRS resource set group contains three SRS resource sets, the three SRS resource sets contain eight SRS resources (for example, the three SRS resource sets contains three, three and two SRS resources, respectively), each SRS resource is configured with one SRS port; SRS resources in different SRS resource sets are transmitted on different slots, and SRS resources in a same resource set are transmitted on different symbols of a same slot; or, the sixth SRS resource set group contains four SRS resource sets, the four SRS resource sets contain eight SRS resources in total (for example, each SRS resource set contains two SRS resources; or two of the SRS resource sets include three SRS resources respectively, and the other two SRS resource sets include one SRS resource respectively), each SRS resource is configured with one SRS port; SRS resources in different SRS resource sets are transmitted on different slots, and SRS resources in a same resource set are transmitted on different symbols of a same slot.

Alternatively, the M SRS resource set groups contain at least one seventh SRS resource set group, and the seventh SRS resource set group corresponds to an antenna switching configuration corresponding to 4T6R; each seventh SRS resource set group contains one SRS resource set.

Each SRS resource set contains two SRS resources, one of the two SRS resources is configured with four SRS ports, and the other SRS resource set is configured with two SRS ports; or, each SRS resource set contains three SRS resources, each SRS resource is configured with two SRS ports.

Alternatively, the M SRS resource set groups contain at least one eighth SRS resource set group, and the eighth SRS resource set group corresponds to an antenna switching configuration corresponding to 2T6R.

If a resourceType field corresponding to an SRS resource set in the eighth SRS resource set group is configured to be periodic or semipersistent, the eighth SRS resource set group contains one SRS resource set, and the SRS resource set contains three SRS resources, and each SRS resource is configured with two SRS ports.

Alternatively, the M SRS resource set groups contain at least one ninth SRS resource set group, and the ninth SRS resource set group corresponds to an antenna switching configuration corresponding to 2T6R.

If a resourceType field corresponding to an SRS resource set in the ninth SRS resource set group is configured to be aperiodic, then: the ninth SRS resource set group contains one SRS resource set, the SRS resource set contains three SRS resources, and each SRS resource is configured with two SRS ports; or, the ninth SRS resource set group contains two SRS resource sets; one of the two SRS resource sets contains one SRS resource and the other SRS resource set contains two SRS resources, each SRS resource is configured with 2 SRS ports; SRS resources in different SRS resource sets are transmitted on different slots, and SRS resources in a same resource set are transmitted on different symbols of a same slot.

Alternatively, the M SRS resource set groups contain at least one tenth SRS resource set group, and the tenth SRS resource set group corresponds to an antenna switching configuration corresponding to 1T6R.

If a resourceType field corresponding to an SRS resource set in the tenth SRS resource set group is configured to be periodic or semipersistent, the tenth SRS resource set group contains one SRS resource set, and the SRS resource set contains six SRS resources, and each SRS resource is configured with one SRS port.

Alternatively, the M SRS resource set groups contain at least one eleventh SRS resource set group, and the eleventh SRS resource set group corresponds to an antenna switching configuration corresponding to 1T6R.

If a resourceType field corresponding to an SRS resource set in the eleventh SRS resource set group is configured to be aperiodic, then: the eleventh SRS resource set group contains two SRS resource sets; the two SRS resource sets contain six SRS resources in total (for example, each of the two SRS resource sets contains three SRS resources, respectively), each SRS resource is configured with one SRS port; SRS resources in different SRS resource sets are transmitted on different slots, and SRS resources in a same resource set are transmitted on different symbols of a same slot; or, the eleventh SRS resource set group contains three SRS resource sets; the three SRS resource sets contain six SRS resources in total (for example, each of the three SRS resource sets contains two SRS resources), each SRS resource is configured with one SRS port; SRS resources in different SRS resource sets are transmitted on different slots, and SRS resources in a same resource set are transmitted on different symbols of a same slot; or, the eleventh SRS resource set group contains one SRS resource set, the SRS resource set contains six SRS resources, and each SRS resource is configured with one SRS port.

Alternatively, if a plurality of SRS resources in an SRS resource set are transmitted on a same slot, the first terminal device does not transmit other signals on Y symbols of a guard period between adjacent SRS resources, wherein Y is a positive integer.

Y may correspond to different values according to different subcarrier spacings, that is, the value of Y is determined according to the subcarrier spacing.

Alternatively, the value of Y may be specified according to a protocol.

Alternatively, for a part of the subcarrier spacings, the value of Y is determined according to a first UE capability reported by the first terminal device; for another part of the subcarriers, the value of Y may be specified according to the protocol. On one hand, this method can reduce the guard period and system overhead for UE with strong capability; on the other hand, this method can reduce the implementation complexity and/or cost of UE with low capability, which is convenient for the popularization of the UE with low capability.

Alternatively, if the value of Y is greater than a predetermined threshold value or equal to a predetermined value, a guard period between SRS resources transmitted on different slots in a same SRS resource set is at least greater than, or is equal to or greater than Y symbols.

Alternatively, if the value of Y is greater than a predetermined threshold value or equal to a predetermined value, a guard period between SRS resources in different SRS resource sets in a same SRS resource set group is at least greater than, or is equal to or greater than Y symbols.

Alternatively, if the value of Y is greater than a predetermined threshold value or equal to a predetermined value, a guard period between SRS resources in different SRS resource sets is at least greater than, or is equal to or greater than Y symbols.

The predetermined threshold value and the predetermined value may be specified by the protocol.

In this way, when the value of Y is increased, enough spacing can be reserved for SRS resources propagated on different slots, thus reducing the implementation complexity of UE.

Alternatively, an SRS resource contained in the SRS resource set occupies all or part of the symbols of one slot, specifically may occupy at least one symbol in the last six symbols of one slot.

Alternatively, the symbol(s) occupied by the SRS resource may be determined according to a second UE capability reported by the first terminal device. In this way, different resources may be allocated for UEs with different capabilities, so that an SRS capacity can be improved.

Alternatively, the second UE capability is used to indicate available symbol information that the first terminal device may use for SRS resource configuration in one slot. For example, it indicates that all 14 symbols of one slot may support the SRS resource configuration, or it indicates that the last 8 symbols of one slot may support the SRS resource configuration.

When the first terminal device does not report the second UE capability, the SRS resource contained in the SRS resource set occupies at least one of the last six symbols of one slot. In other words, when the UE does not report a stronger capability, a capability supported by a terminal in the existing protocol is used by default.

Alternatively, if antenna switching corresponding to xTyR (wherein y=6, or y=8) is configured for the at least one SRS resource set, that is, UEs with more receiving antennas are supported, then the network device or the second terminal device can obtain more complete channel information between itself and the first terminal device, assisting in pre-coding determination, and improving communication performance between each other.

Alternatively, if x<y, different SRS resource sets cannot be transmitted on the same slot, thus avoiding the need to introduce extra spacing in the same slot, reducing system overhead.

Alternatively, if x=y, different SRS resource sets cannot be transmitted on the same symbol, thereby avoiding discarding transmission of some SRS resources because the UE cannot support simultaneous transmissions, and improving system performance.

Alternatively, SRS ports for an SRS resource(s) in one SRS resource set group correspond to different antenna ports of the first terminal device.

Alternatively, the configuration information corresponds to a third UE capability reported by the first terminal device.

Alternatively, the third UE capability indicates that the first terminal device has an antenna switching capability corresponding to xTyR; wherein there is at least one y, which takes one of 6 and 8, in the xTyR corresponding to the antenna switching capability, or there is at least one y, which takes 8, in the xTyR corresponding to the antenna switching capability.

Alternatively, y may be one of 1, 2, 4.

Alternatively, y may be one of 1, 2, 4, 6, 8; and there is at least one y that is equal to 6, or at least one y that is equal to one of 6 and 8.

Alternatively, a Usage field in the RRC Information Element (IE) corresponding to the SRS resource set is configured to be AntennaSwitching.

Alternatively, a resourceType field corresponding to at least one SRS resource set in one SRS resource set group is configured to be a same value.

Alternatively, the resourceType field may be configured to one of the following: aperiodic, semiPersistent, periodic.

Alternatively, a subcarrier spacing corresponding to an SRS resource in an SRS resource set is:
one of 15 KHz, 30 KHz, 60 KHz and 120 KHz; or
one of 15 KHz, 30 KHz, 60 KHz, 120 KHz and 240 KHz; or,
one of 15 KHz, 30 KHz, 60 KHz, 120 KHz, 240 KHz and 480 KHz; or,
one of 15 KHz, 30 KHz, 60 KHz, 120 KHz, 240 KHz, 480 KHz and 960 KHz; or,
one of 15 KHz, 30 KHz, 60 KHz, 120 KHz, 240 KHz, 480 KHz, 960 KHz and 1920 KHz.

In this way, communication in a high frequency band can be better supported.

Alternatively the first terminal device does not support the antenna switching capability corresponding to xTyR (y>4) when the subcarrier spacing is larger than the first threshold; or, the first terminal device does not support the antenna switching capability corresponding to xTyR (y>6) when the subcarrier spacing is larger than the first threshold.

Alternatively, the first threshold corresponds to a subcarrier spacing of 120 KHz.

In this way, when analog beamforming is considered in high frequency band, the number of receiving antennas visible in the digital domain will not be very large, which can greatly reduce complexity of protocol design.

Alternatively, for a plurality of SRS resource sets in a same SRS resource set group, a part or all of the following power parameters corresponding to the plurality of SRS resource sets are the same: alpha; p0; pathlossReferenceRS; and srs-Power Control Adjustment States.

Alternatively, the method further includes: the first terminal device sends an SRS signal according to the configuration information. Accordingly, the network device or the second terminal device receives the SRS signal sent by the first terminal device, then the network device or the second terminal device performs measurement according to the received SRS signal, determines a pre-coding matrix corresponding to the first terminal device, and transmits a corresponding Physical Downlink Shared Channel (PDSCH) or Physical Downlink Control Channel (PDCCH) or another channel or a signal.

Contents indicated by the configuration information will be described in detail below by providing specific embodiments.

First Embodiment

The present embodiment may support a terminal which is of 8 receiving antennas and 8 transmitting antennas (hereinafter referred to as a first terminal A). M (e.g. M=1, 2, or 3) SRS resource set groups (hereinafter referred to as SRS resource set groups) indicated by the configuration information at least contain one SRS resource set group corresponding to 8T8R antenna switching configuration.

In this embodiment, M SRS resource set groups may be configured for the first terminal A, each SRS resource set group contains only one SRS resource set, resourceType values corresponding to SRS resource sets in different SRS resource set groups are different, each SRS resource set contains one SRS resource, and each SRS resource is configured with eight SRS ports.

Second Embodiment

The present embodiment may support a terminal which is of 8 receiving antennas and 4 transmitting antennas (hereinafter referred to as a first terminal A). M (e.g. M=1, 2, or 3) SRS resource set groups indicated by the configuration information at least contain one SRS resource set group corresponding to 4T8R antenna switching configuration.

In this embodiment, the first terminal A may be configured with M SRS resource set groups.
Each SRS resource set group contains only one SRS resource set.
In each SRS resource set:
Two SRS resources are contained.
Each SRS resource is configured with four SRS ports.
Different SRS resources are transmitted on different symbols.
SRS ports of the two SRS resources correspond to different antenna ports of the first terminal A.

Third Embodiment

The present embodiment may support a terminal which is of 8 receiving antennas and 2 transmitting antennas (hereinafter referred to as a first terminal A). M (e.g. M=1, 2, or 3) SRS resource set groups indicated by the configuration information at least contain one SRS resource set group corresponding to 2T8R antenna switching configuration.

In this embodiment, the first terminal A may be configured with M SRS resource set groups.
If a resourceType corresponding to an SRS resource set in an SRS resource set group is periodic or semiPersistent, then the configuration is as follows.
The SRS resource set group contains only one SRS resource set.
Four SRS resources are configured in the SRS resource set.
Each SRS resource is configured with two SRS ports.
SRS ports of different SRS resources correspond to different antenna ports of the first terminal A.
If the resourceType corresponding to an SRS resource set in an SRS resource set group is aperiodic, there may be following different configurations.
First mode
The SRS resource set group contains two SRS resource sets.
Each SRS resource set contains two SRS resources.
Each SRS resource is configured with two SRS ports.
The four SRS resources are transmitted on different symbols of two different slots.
SRS ports of different SRS resources correspond to different antenna ports of the first terminal A.
Second mode
The SRS resource set group contains two SRS resource sets.
One of the two SRS resource sets contains one SRS resource, and the other SRS resource set contains three SRS resources.
Each SRS resource is configured with two SRS ports.
The four SRS resources are transmitted on different symbols of two different slots.
SRS ports of different SRS resources correspond to different antenna ports of the first terminal A.
Third mode
The SRS resource set group contains only one SRS resource set.
Four SRS resources are configured in the SRS resource set.
Each SRS resource is configured with two SRS ports.
SRS ports of each SRS resource correspond to different antenna ports of the first terminal A.
A precondition of the configuration is that the first terminal A reports the second UE capability, so that SRS resources allowed on a same slot are enough to place SRS resources corresponding to the configuration.

Fourth Embodiment

The present embodiment may support a terminal which is of 8 receiving antennas and 1 transmitting antennas (hereinafter referred to as a first terminal A). M (e.g. M=1, 2, or 3) SRS resource set groups indicated by the configuration information at least contain one SRS resource set group corresponding to 1T8R antenna switching configuration.

In this embodiment, the first terminal A may be configured with M SRS resource set groups.
If the resourceType corresponding to an SRS resource set in an SRS resource set group is periodic or semiPersistent, then the configuration is as follows.
The SRS resource set group contains only one SRS resource set.
Eight SRS resources are configured in the SRS resource set.
Each SRS resource is configured with one SRS port.
SRS ports of different SRS resources correspond to different antenna ports of the first terminal A.
If the resourceType corresponding to an SRS resource set in an SRS resource set group is aperiodic, there may be following different configurations.
First mode
The SRS resource set group contains two SRS resource sets.
The two SRS resource sets contain B and C SRS resources, respectively, wherein B+C=8.
Each SRS resource is configured with one SRS port.
The eight SRS resources are transmitted on different symbols of two different slots.
SRS ports of different SRS resources correspond to different antenna ports of the first terminal A.
Typical parameters are B=C=4.
A precondition of the configuration is that the first terminal A reports the second UE capability, so that SRS resources allowed on a same slot are enough to place SRS resources corresponding to the configuration.

Second mode
  The SRS resource set group contains three SRS resource sets.
  The three SRS resource sets contain B, C and D SRS resources, respectively, wherein B+C+D=8.
  Each SRS resource is configured with one SRS port.
  The eight SRS resources are transmitted on different symbols of different slots.
  SRS ports of different SRS resources correspond to different antenna ports of the first terminal A.
  Typical parameters are B=C=3, and D=2.
Third mode
  The SRS resource set group contains four SRS resource sets.
  The four SRS resource sets contain B, C, D and E SRS resources, respectively, wherein B+C+D+E=8.
  Each SRS resource is configured with one SRS port.
  The eight SRS resources are transmitted on different symbols of different slots.
  SRS ports of different SRS resources correspond to different antenna ports of the first terminal A.
  Typical parameters are B=C=D=E=2, or, B=C=3, and D=E=1.

Fifth Embodiment

The present embodiment may support a terminal which is of 6 receiving antennas and 4 transmitting antennas (hereinafter referred to as a first terminal A). M (e.g. M=1, 2, or 3) SRS resource set groups indicated by the configuration information at least contain one SRS resource set group corresponding to 4T6R antenna switching configuration.

In this embodiment, the first terminal A can be configured with M SRS resource set groups.
  Each SRS resource set group contains only one SRS resource set.
  There may be the following two configuration alternatives for each SRS resource set.
  First mode
    Two SRS resources are contained.
    One of the two SRS resources is configured with four SRS ports, and the other SRS resource is configured with two SRS ports.
    Different SRS resources are transmitted on different symbols.
    SRS ports of the two SRS resources correspond to different antenna ports of the first terminal A.
  Second mode
    Three SRS resources are contained.
    Each SRS resource is configured with two SRS ports.
    Different SRS resources are transmitted on different symbols.
    SRS ports of the three SRS resources correspond to different antenna ports of the first terminal A.

Sixth Embodiment

The present embodiment may support a terminal which is of 6 receiving antennas and 2 transmitting antennas (hereinafter referred to as a first terminal A). M (e.g. M=1, 2, or 3) SRS resource set groups indicated by the configuration information at least contain one SRS resource set group corresponding to 2T6R antenna switching configuration.

In this embodiment, the first terminal A can be configured with M SRS resource set groups.
  If the resourceType corresponding to an SRS resource set in an SRS resource set group is periodic or semiPersistent, then the configuration is as follows.
    The SRS resource set group contains only one SRS resource set.
    Three SRS resources are configured in the SRS resource set.
    Each SRS resource is configured with two SRS ports.
    SRS ports of different SRS resources correspond to different antenna ports of the first terminal A.
  If the resourceType corresponding to an SRS resource set in an SRS resource set group is aperiodic, there may be the following different configurations.
    First mode
      The SRS resource set group contains only one SRS resource set.
      Three SRS resources are configured in the SRS resource set.
      Each SRS resource is configured with two SRS ports.
      SRS ports of different SRS resources correspond to different antenna ports of the first terminal A.
    Second mode
      The SRS resource set group contains two SRS resource sets.
      One of the two SRS resource sets contains one SRS resource and the other SRS resource set contains two SRS resources.
      Each SRS resource is configured with two SRS ports.
      The three SRS resources are transmitted on different symbols of two different slots.
      SRS ports of different SRS resources correspond to different antenna ports of the first terminal A.

Seventh Embodiment

The present embodiment may support a terminal which is of 6 receiving antennas and 1 transmitting antennas (hereinafter referred to as a first terminal A). M (e.g. M=1, 2, or 3) SRS resource set groups indicated by the configuration information at least contain one SRS resource set group corresponding to 1T6R antenna switching configuration.

In this embodiment, the first terminal A may be configured with M SRS resource set groups.
  If the resourceType corresponding to an SRS resource set in an SRS resource set group is periodic or semiPersistent, then the configuration is as follows.
    The SRS resource set group contains only one SRS resource set.
    Six SRS resources are configured in the SRS resource set.
    Each SRS resource is configured with one SRS port.
    SRS ports of different SRS resources correspond to different antenna ports of the first terminal A.
  If the resourceType corresponding to an SRS resource set in an SRS resource set group is aperiodic, there may be the following different configurations.
    First mode
      The SRS resource set group contains two SRS resource sets.
      The two SRS resource sets contain B and C SRS resources, respectively, wherein B+C=6.
      Each SRS resource is configured with one SRS port.
      The six SRS resources are transmitted on different symbols of two different slots.

SRS ports of different SRS resources correspond to different antenna ports of the first terminal A.

Typical parameters are B=C=3.

Second mode

The SRS resource set group contains three SRS resource sets.

The three SRS resource sets contain B, C and D SRS resources, respectively, wherein B+C+D=6.

Each SRS resource is configured with one SRS port.

The eight SRS resources are transmitted on different symbols of different slots.

SRS ports of different SRS resources correspond to different antenna ports of the first terminal A.

Typical parameters are B=C=D=2.

Third mode

The SRS resource set group contains one SRS resource set.

The SRS resource set contains six SRS resources.

Each SRS resource is configured with one SRS port.

The six SRS resources are transmitted on different symbols of a same slot.

SRS ports of different SRS resources correspond to different antenna ports of the first terminal A.

A precondition of the configuration is that the first terminal A reports the second UE capability, so that SRS resources allowed on a same slot are enough to place SRS resources corresponding to the configuration.

Figure 3:
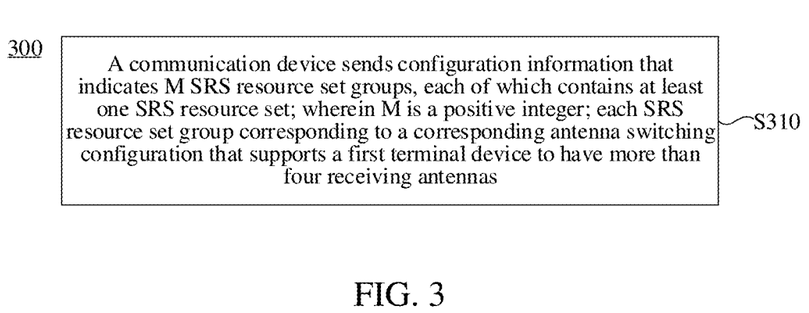
FIG. 3 is a flow chart of an implementation of another antenna switching method according to an embodiment of the present disclosure.

Another antenna switching method is also provided in an embodiment of the present disclosure. FIG. 3 is a flow chart of an implementation of another antenna switching method according to an embodiment of the present disclosure, including the following act S310.

In the S310, a communication device sends configuration information; the configuration information indicates M Surrounding Reference Signal (SRS) resource set groups, each of which contains at least one SRS resource set; wherein M is a positive integer; each SRS resource set group corresponds to a corresponding antenna switching configuration that supports a first terminal device to have more than four receiving antennas.

Alternatively, the antenna switching configuration is represented by xTyR; wherein y is an integer greater than 4 and x is a positive integer; xTyR indicates that the SRS supports transmission by x antenna ports, y corresponds to the number of all or part of receiving antennas of the first terminal device.

Alternatively, the communication device is a network device or a second terminal device. The communication device sends the configuration information to the first terminal device.

Alternatively, the communication device receives an antenna switching capability reported by the first terminal device, and the antenna switching capability supports the antenna switching configuration represented by the xTyR. Alternatively, the communication device receives the antenna switching capability reported by the first terminal through an RRC signaling.

In the embodiment, specific contents indicated by the configuration information are the same as the contents in the above-mentioned embodiments, which will not be repeated here.

Figure 4:
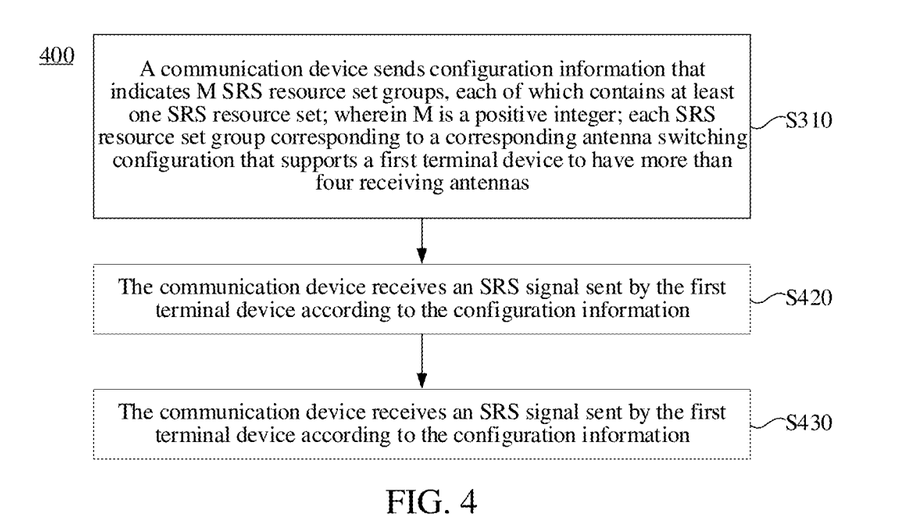
FIG. 4 is a flow chart of an implementation of another antenna switching method according to an embodiment of the present disclosure.

FIG. 4 is a flow chart of an implementation of another antenna switching method according to an embodiment of the present disclosure. As shown in FIG. 4, the act S310 may be followed by acts S420 and S430.

In the S420, the communication device receives an SRS signal sent by the first terminal device according to the configuration information.

In the S430, a pre-coding matrix or a beamforming matrix of the first terminal device is determined according to the SRS signal.

Figure 5:
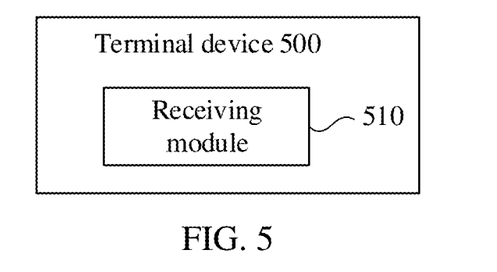
FIG. 5 is a schematic diagram of a structure of a terminal device 500 according to an embodiment of the present disclosure.

A terminal device is also provided in an embodiment of the present disclosure. FIG. 5 is a schematic diagram of a structure of a terminal device 500 according to an embodiment of the present disclosure. The terminal device 500 includes: a receiving module 510, which is configured to receive configuration information; wherein the configuration information indicates M Surrounding Reference Signal (SRS) resource set groups, each of which contains at least one SRS resource set; wherein M is a positive integer; each SRS resource set group corresponds to a corresponding antenna switching configuration that supports a first terminal device to have more than four receiving antennas.

Alternatively, the antenna switching configuration is represented by xTyR; wherein y is an integer greater than 4 and x is a positive integer; xTyR indicates that the SRS supports transmission by x antenna ports, y corresponds to the number of all or part of receiving antennas of the first terminal device.

It should be understood that the above-mentioned and other operations and/or functions of modules in the terminal device according to the embodiment of the present disclosure are respectively for implementing corresponding processes of the first terminal device in the method 200 in FIG. 2, which will not be repeated here for brevity.

Figure 6:
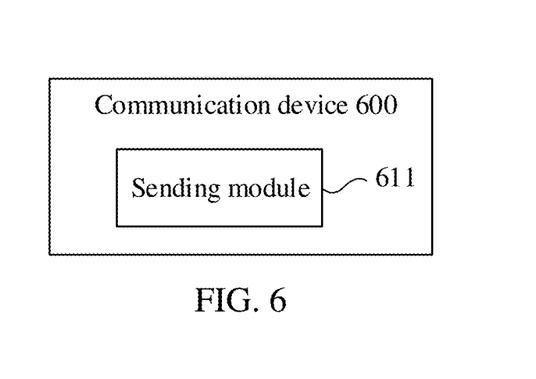
FIG. 6 is a schematic diagram of a structure of a communications device 600 according to an embodiment of the present disclosure.

A communication device is also provided in an embodiment of the present disclosure. FIG. 6 is a schematic diagram of a structure of a communication device 600 according to an embodiment of the present disclosure. The communication device 600 includes: a sending module 611, which is configured to send configuration information; wherein the configuration information indicates M Surrounding Reference Signal (SRS) resource set groups, each of which contains at least one SRS resource set; wherein M is a positive integer; each SRS resource set group corresponds to a corresponding antenna switching configuration that supports a first terminal device to have more than four receiving antennas.

Alternatively, the antenna switching configuration is represented by xTyR; wherein y is an integer greater than 4 and x is a positive integer; xTyR indicates that the SRS supports transmission by x antenna ports, y corresponds to the number of all or part of receiving antennas of the first terminal device.

Alternatively, the communication device may be a network device or a terminal device.

It should be understood that the above-mentioned and other operations and/or functions of modules in the communication device according to the embodiment of the present disclosure are respectively for implementing corresponding processes of the communication device in the method 300 in FIG. 3 and the method 400 in FIG. 4, which will not be repeated here for brevity.

Figure 7:
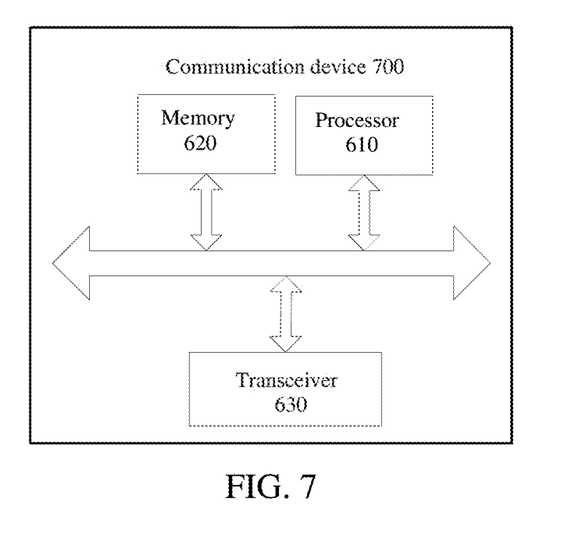
FIG. 7 is a schematic diagram of a structure of a communications device 700 according to an embodiment of the present disclosure.

FIG. 7 is a schematic diagram of a structure of a communication device 700 according to an embodiment of the present disclosure. The communication device 700 shown in FIG. 7 includes a processor 610, which may invoke and run a computer program from a memory to implement any of the methods in the embodiments of the present disclosure.

Alternatively, as shown in FIG. 7, the communication device 700 may further include a memory 620. The processor 610 may invoke and run a computer program from the memory 620 to implement any of the methods in the embodiments of the present disclosure.

The memory 620 may be a separate device independent of the processor 610, or may be integrated in the processor 610.

Alternatively, as shown in FIG. 7, the communication device 700 may further include a transceiver 630, and the processor 610 may control the transceiver 630 to communicate with another device. Specifically, the transceiver 630 may send information or data to another device or receive information or data sent by another device.

The transceiver 630 may include a transmitter and a receiver. The transceiver 630 may further include antennas, a quantity of which may be one or more.

Alternatively, the communication device 700 may be the first terminal device according to the embodiments of the present disclosure, and the communication device 700 may implement corresponding flows implemented by the first terminal device in various methods of the embodiments of the present disclosure, which will not be repeated here for brevity.

Alternatively, the communication device 700 may be a communication device according to the embodiments of the present disclosure (such as the network device or the second terminal device), and the communication device 700 may implement corresponding flows implemented by the communication device in various methods according to the embodiments of the present disclosure, which will not be repeated here for brevity.

Figure 8:
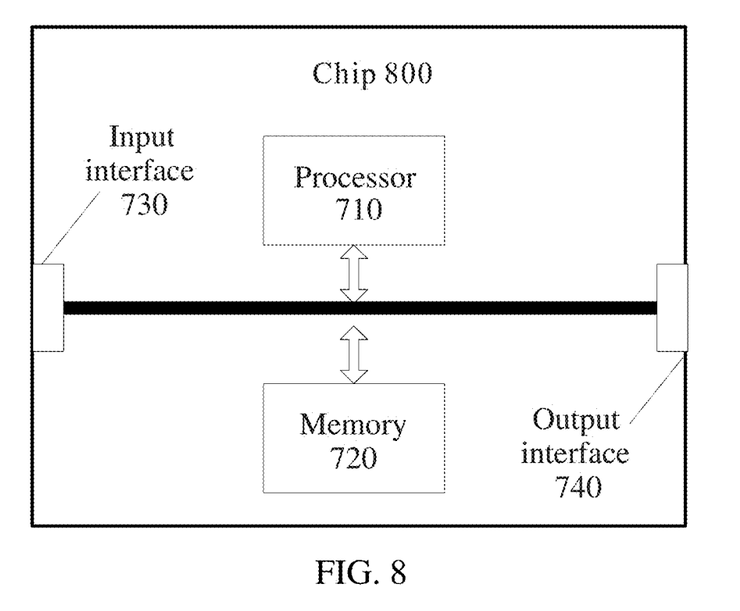
FIG. 8 is a schematic diagram of a structure of a chip 800 according to an embodiment of the present disclosure.

FIG. 8 is a schematic diagram of a structure of a chip 800 according to an embodiment of the present disclosure. The chip 800 shown in FIG. 8 includes a processor 710, wherein the processor 710 may invoke and run a computer program from a memory to implement any of the methods in the embodiments of the present disclosure.

Alternatively, as shown in FIG. 8, the chip 800 may further include a memory 720. The processor 710 may invoke and run a computer program from the memory 720 to implement any of the methods in the embodiments of the present disclosure.

The memory 720 may be a separate device independent of the processor 710, or may be integrated in the processor 710.

Alternatively, the chip 700 may further include an input interface 730. The processor 710 may control the input interface 730 to communicate with another device or chip. Specifically, the processor 710 may acquire information or data sent by another device or chip.

Alternatively, the chip 700 may further include an output interface 740. The processor 710 may control the output interface 740 to communicate with another device or chip. Specifically, the processor 710 may output information or data to another device or chip.

Alternatively, the chip may be applied to the first terminal device in the embodiments of the present disclosure, and the chip may implement the corresponding flows implemented by the first terminal device in various methods of the embodiments of the present disclosure, which will not be repeated here for brevity.

Alternatively, the chip may be applied to a communication device in the embodiment of the present disclosure, such as the network device or the second terminal device, and the chip may implement corresponding flows implemented by the communication device in various methods according to the embodiments of the present disclosure, which will not be repeated here for brevity.

It should be understood that the chip mentioned in the embodiments of the present disclosure may also be referred to as a system-level chip, a system chip, a chip system, or a system on chip, etc.

The above-mentioned processor may be a general purpose processor, a Digital Signal Processor (DSP), a Field Programmable Gate Array (FPGA), an Application Specific Integrated Circuit (ASIC) or another programmable logic device, a transistor logic device, or a discrete hardware component, etc. The above-mentioned general-purpose processor may be a microprocessor or any conventional processor, etc.

The above-mentioned memory may be a volatile memory or non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It should be understood that, the foregoing memories are examples for illustration and should not be construed as limitations. For example, the memory in the embodiment of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM), etc. That is to say, the memories in the embodiments of the present disclosure are intended to include, but are not limited to, these and any other suitable types of memories.

The above-mentioned embodiments may be implemented in whole or in part through software, hardware, firmware, or any combination thereof. When implemented through software, they may be implemented in whole or in part in a form of a computer program product. The computer program product includes one or more computer instructions. When the computer program instructions are loaded and executed on a computer, flows or functions described in the embodiments of the present disclosure are generated in whole or in part. The computer may be a general purpose computer, a special purpose computer, a computer network, or another programmable apparatus. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, and a Digital Subscriber Line (DSL)) or a wireless mode (e.g., infrared radiation, radio, and microwave). The computer-readable storage medium may be any available medium that can be accessed by a computer or a data storage device such as a server, a data center, or the like that integrates one or more available media. The available media may be magnetic media (e.g., floppy disks, hard disks, magnetic tapes), optical media (e.g., Digital Versatile Disks (DVDs)), or semiconductor media (e.g., Solid State Disks (SSDs)), or the like.

It should be understood that in various embodiments of the present disclosure, sequence numbers of the various processes do not imply an order of execution of the various processes, which should be determined by their functions and internal logics, but should not constitute any limitation on implementation processes of the embodiments of the present disclosure.

Those skilled in the art may clearly understand that for convenience and conciseness of description, specific work-

19 ing processes of the systems, apparatuses, and units described above may refer to corresponding processes in the aforementioned method embodiments, and details will not be repeated here.

The above are merely specific embodiments of the present disclosure, but the protection scope of the present disclosure is not limited thereto. Any person skilled in the art may readily conceive variations or substitutions within the technical scope disclosed by the present disclosure, which should be included within the protection scope of the present disclosure. Therefore, the protection scope of the present disclosure shall be subject to the protection scope of the claims.

The invention claimed is:

1. An antenna switching method, comprising:
receiving, by a first terminal device, configuration information;
wherein the configuration information indicates M Sounding Reference Signal (SRS) resource set groups, each of which contains at least one SRS resource set; wherein M is equal to 1, 2 or 3; and a resourceType field corresponding to at least one SRS resource set in one SRS resource set group is configured to be a same value;
each of the SRS resource set groups corresponds to a corresponding antenna switching configuration that supports the first terminal device to have more than four receiving antennas;
wherein, the antenna switching configuration is represented by xTyR; wherein y is an integer greater than 4, and x is a positive integer; the xTyR indicates that an SRS supports transmission by x antenna ports, and y corresponds to a number of all or part of receiving antennas of the first terminal device;
wherein the method further comprises:
when a plurality of SRS resources in one SRS resource set are transmitted on a same slot, not transmitting, by the first terminal device, other signals on Y symbols of a guard period between adjacent SRS resources, wherein Y is a positive integer;
wherein a value of Y is determined according to a subcarrier spacing;
wherein, when the value of Y is greater than a predetermined threshold value or equal to a predetermined value, a guard period between SRS resources in different SRS resource sets in a same SRS resource set group is at least greater than, or is equal to or greater than Y symbols;
wherein an SRS resource contained in an SRS resource set occupies all or part of symbols of one slot; at least one symbol occupied by the SRS resource is determined according to a second UE capability reported by the first terminal device, the second UE capability is used for indicating available symbol information that is available for SRS resource configuration by the first terminal device in one slot; when the first terminal device does not report the second UE capability, the SRS resource contained in the SRS resource set occupies at least one symbol of the last six symbols of one slot;
wherein the method further comprises:
reporting, by the first terminal device, an antenna switching capability that supports the antenna switching configuration represented by the xTyR.

2. The method according to claim 1, wherein if a resourceType field corresponding to an SRS resource set contained in an SRS resource set group is configured to be periodic or semipersistent, the SRS resource set group contains one SRS resource set.

3. The method according to claim 1, wherein, when x is not equal to y, resourceType fields corresponding to SRS resource sets in different SRS resource set groups are configured to be different values.

4. The method according to claim 1, wherein
the M SRS resource set groups contain at least one second SRS resource set group, and a second SRS resource set group corresponds to an antenna switching configuration corresponding to 4T8R;
the second SRS resource set group contains one SRS resource set, each SRS resource set contains two SRS resources, and each SRS resource is configured with four SRS ports.

5. The method according to claim 1, wherein
the M SRS resource set groups contain at least one third SRS resource set group, and a third SRS resource set group corresponds to an antenna switching configuration corresponding to 2T8R;
if a resourceType field corresponding to an SRS resource set in the third SRS resource set group is configured to be periodic or semipersistent, the third SRS resource set group contains one SRS resource set, and the SRS resource set contains four SRS resources, and each SRS resource is configured with two SRS ports.

6. The method according to claim 1, wherein
the M SRS resource set groups contain at least one fourth SRS resource set group, and a fourth SRS resource set group corresponds to an antenna switching configuration corresponding to 2T8R;
if a resourceType field corresponding to an SRS resource set in the fourth SRS resource set group is configured to be aperiodic, the fourth SRS resource set group contains two SRS resource sets, each SRS resource set contains two SRS resources, and each SRS resource is configured with two SRS ports; SRS resources in different SRS resource sets are transmitted on different slots, and SRS resources in a same resource set are transmitted on different symbols of a same slot; or,
the fourth SRS resource set group contains two SRS resource sets, one of the two SRS resource sets contains one SRS resource and the other SRS resource set contains three SRS resources; each SRS resource is configured with two SRS ports; SRS resources in different SRS resource sets are transmitted on different slots, and SRS resources in a same resource set are transmitted on different symbols of a same slot; or,
the fourth SRS resource set group contains one SRS resource set, the SRS resource set contains fourth SRS resources, and each SRS resource is configured with two SRS ports.

7. The method according to claim 1, wherein
the M SRS resource set groups contain at least one fifth SRS resource set group, and a fifth SRS resource set group corresponds to an antenna switching configuration corresponding to 1T8R;
if a resourceType field corresponding to an SRS resource set in the fifth SRS resource set group is configured to be periodic or semipersistent, the fifth SRS resource set group contains one SRS resource set, and the SRS resource set contains eight SRS resources, and each SRS resource is configured with one SRS port.

8. The method according to claim 1, wherein
the M SRS resource set groups contain at least one sixth SRS resource set group, and a sixth SRS resource set group corresponds to an antenna switching configuration corresponding to 1T8R;
if a resourceType field corresponding to an SRS resource set in the sixth SRS resource set group is configured to be aperiodic, the sixth SRS resource set group contains two SRS resource sets, the two SRS resource sets are configured with eight SRS resources in total, each SRS resource is configured with one SRS port; SRS resources in different SRS resource sets are transmitted on different slots, and SRS resources in a same resource set are transmitted on different symbols of a same slot; or,
the sixth SRS resource set group contains three SRS resource sets, the three SRS resource sets contain eight SRS resources in total, and each SRS resource contains one SRS port; SRS resources in different SRS resource sets are transmitted on different slots, and SRS resources in a same resource set are transmitted on different symbols of a same slot; or,
the sixth SRS resource set group contains four SRS resource sets, the four SRS resource sets contain eight SRS resources in total, and each SRS resource is configured with one SRS port; SRS resources in different SRS resource sets are transmitted on different slots, and SRS resources in a same resource set are transmitted on different symbols of a same slot.

9. The method according to claim 1, wherein
the M SRS resource set groups contain at least one eighth SRS resource set group, and an eighth SRS resource set group corresponds to an antenna switching configuration corresponding to 2T6R;
if a resourceType field corresponding to an SRS resource set in the eighth SRS resource set group is configured to be periodic or semipersistent, the eighth SRS resource set group contains one SRS resource set, and the SRS resource set contains three SRS resources, and each SRS resource is configured with two SRS ports.

10. The method according to claim 1, wherein
the M SRS resource set groups contain at least one ninth SRS resource set group, and a ninth SRS resource set group corresponds to an antenna switching configuration corresponding to 2T6R;
if a resourceType field corresponding to an SRS resource set in the ninth SRS resource set group is configured to be aperiodic, the ninth SRS resource set group contains one SRS resource set, and the SRS resource set contains three SRS resources, and each SRS resource is configured with two SRS ports; or,
the ninth SRS resource set group contains two SRS resource sets, one of the two SRS resource sets contains one SRS resource and the other SRS resource set contains two SRS resources, each SRS resource is configured with two SRS ports; SRS resources in different SRS resource sets are transmitted on different slots, and SRS resources in a same resource set are transmitted on different symbols of a same slot.

11. The method according to claim 1, wherein
the M SRS resource set groups contain at least one tenth SRS resource set group, and a tenth SRS resource set group corresponds to an antenna switching configuration corresponding to 1T6R;
if a resourceType field corresponding to an SRS resource set in the tenth SRS resource set group is configured to be periodic or semisistent, the tenth SRS resource set group contains one SRS resource set, and the SRS resource set contains six SRS resources, and each SRS resource is configured with one SRS port.

12. The method according to claim 1, wherein
the M SRS resource set groups contain at least one eleventh SRS resource set group, and an eleventh SRS resource set group corresponds to an antenna switching configuration corresponding to 1T6R;
if a resourceType field corresponding to an SRS resource set in the eleventh SRS resource set group is configured to be aperiodic, the eleventh SRS resource set group contains two SRS resource sets, the two SRS resource sets contain six SRS resources in total, each SRS resource is configured with one SRS port; SRS resources in different SRS resource sets are transmitted on different slots, and SRS resources in a same resource set are transmitted on different symbols of a same slot; or,
the eleventh SRS resource set group contains three SRS resource sets, the three SRS resource sets contain six SRS resources in total, and each SRS resource is configured with one SRS port; SRS resources in different SRS resource sets are transmitted on different slots, and SRS resources in a same resource set are transmitted on different symbols of a same slot; or,
the eleventh SRS resource set group contains one SRS resource set that contains six SRS resources, and each SRS resource is configured with one SRS port.

13. The method according to claim 1, wherein, if antenna switching corresponding to xTyR is configured for the at least one SRS resource set, wherein y is equal to 6 or 8, different SRS resource sets are transmitted on different slots when x is less than y.

14. The method according to claim 1, wherein the configuration information corresponds to a third UE capability reported by the first terminal device;
wherein the third UE capability indicates that the first terminal device has an antenna switching capability corresponding to xTyR;
wherein there is at least one y, which takes one of 6 and 8, in the xTyR corresponding to the antenna switching capability, or there is at least one y, which takes 8, in the xTyR corresponding to the antenna switching capability.

15. The method according to claim 1, wherein a subcarrier spacing corresponding to an SRS resource in the SRS resource set is:
one of 15 KHz, 30 KHz, 60 KHz and 120 KHz; or
one of 15 KHz, 30 KHz, 60 KHz, 120 KHz and 240 KHz; or,
one of 15 KHz, 30 KHz, 60 KHz, 120 KHz, 240 KHz and 480 KHz; or,
one of 15 KHz, 30 KHz, 60 KHz, 120 KHz, 240 KHz, 480 KHz and 960 KHz; or, one of 15 KHz, 30 KHz, 60 KHz, 120 KHz, 240 KHz, 480 KHz, 960 KHz and 1920 KHz.

16. The method according to claim 1, wherein, for a plurality of SRS resource sets in a same SRS resource set group, a part or all of the following power parameters corresponding to the plurality of SRS resource sets are the same:
alpha;
p0;
pathlossReferenceRS; and
srs-Power Control Adjustment States.

17. A terminal device, comprising:
a transceiver, configured to receive configuration information; wherein the configuration information indicates M Sounding Reference Signal (SRS) resource set groups, each of which contains at least one SRS resource set; wherein M is equal to 1, 2 or 3; and a resourceType field corresponding to at least one SRS resource set in one SRS resource set group is configured to be a same value;
each of the SRS resource set groups corresponds to a corresponding antenna switching configuration that supports a first terminal device to have more than four receiving antennas;
wherein, the antenna switching configuration is represented by xTyR; wherein y is an integer greater than 4 and x is a positive integer; the xTyR indicates that the SRS supports transmission by x antenna ports, and y corresponds to a number of all or part of receiving antennas of the first terminal device;
wherein when a plurality of SRS resources in one SRS resource set are transmitted on a same slot, the terminal device does not transmit other signals on Y symbols of a guard period between adjacent SRS resources, wherein Y is a positive integer;
a value of Y is determined according to a subcarrier spacing;
when the value of Y is greater than a predetermined threshold value or equal to a predetermined value, a guard period between SRS resources in different SRS resource sets in a same SRS resource set group is at least greater than, or is equal to or greater than Y symbols;
wherein an SRS resource contained in an SRS resource set occupies all or part of symbols of one slot; at least one symbol occupied by the SRS resource is determined according to a second UE capability reported by the first terminal device, the second UE capability is used for indicating available symbol information that is available for SRS resource configuration by the first terminal device in one slot; when the first terminal device does not report the second UE capability, the SRS resource contained in the SRS resource set occupies at least one symbol of the last six symbols of one slot;
wherein the transceiver is further configured to report an antenna switching capability that supports the antenna switching configuration represented by the xTyR.

* * * * *